(12) United States Patent
Shah et al.

(10) Patent No.: US 6,282,467 B1
(45) Date of Patent: *Aug. 28, 2001

(54) THREE-AXIS INERTIAL ATTITUDE DETERMINATION FOR SPINNING SPACECRAFT

(75) Inventors: Piyush R. Shah, Germantown, MD (US); Garry Didinsky, Los Angeles; David S. Uetrecht, Palos Verdes, both of CA (US)

(73) Assignee: The Boeing Company, Seattle, WA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/949,634

(22) Filed: Oct. 14, 1997

(51) Int. Cl.$^7$ .................................................. B64G 1/24
(52) U.S. Cl. ............................................... 701/13; 244/164
(58) Field of Search ................... 701/3, 4, 13, 220, 701/222; 244/164, 165, 170, 171

(56) References Cited

U.S. PATENT DOCUMENTS

| | | | |
|---|---|---|---|
| 3,591,108 | * 7/1971 | Perkel et al. ......................... | 244/170 |
| 3,637,170 | * 1/1972 | Paine et al. .......................... | 701/222 |
| 4,617,634 | * 10/1986 | Izumida et al. ..................... | 244/165 |
| 4,749,157 | * 6/1988 | Neufeld ............................... | 244/171 |
| 5,123,617 | * 6/1992 | Linder et al. ....................... | 244/166 |
| 5,452,869 | * 9/1995 | Basuthakur et al. ................ | 244/164 |
| 5,702,067 | * 12/1997 | Bruederle ........................... | 244/170 |

* cited by examiner

Primary Examiner—Michael J. Zanelli
Assistant Examiner—Eric M Gibson
(74) Attorney, Agent, or Firm—Terje Gudmestad

(57) ABSTRACT

A system and method for determining the attitude in an inertial frame of a spacecraft spinning about an axis in a body frame including determining momentum vector direction in the inertial frame; determining momentum vector direction in the body frame; acquiring information from an at least single-axis sensor; obtaining reference information on the at least single-axis sensor; updating the attitude in the inertial reference frame using the momentum vector direction in the inertial frame, the momentum vector direction in the body frame, the output of the at least single-axis sensor, and the reference information on the at least single-axis sensor; and propagating the attitude using data from one or more inertial sensors.

13 Claims, 3 Drawing Sheets

THREE-AXIS INERTIAL ATTITUDE DETERMINATION FOR SPINNING SPACECRAFT

TECHNICAL FIELD

The present invention relates in general to attitude control of a spacecraft and in particular to using spacecraft momentum to acquire or update the attitude or a spinning updraft.

BACKGROUND ART

Most spacecraft require attitude information relative to a reference frame in order to perform motion control or for mission operations. For earth satellites, an Earth Centered Inertial (ECI) frame is often preferred because it simplifies references for operations personnel.

Typically a spinning spacecraft, such as a satellite, may make a series of control actions to modify attitude and orbit. Preceding each control action is an attitude determination phase. Accurate attitude determination is critical to minimizing the number and extent of each control action. Preceding each attitude determination phase may be a nutation dampening phase to increase the accuracy of the attitude determination.

Many systems and methods are available for determining the attitude of spinning spacecraft. Such a method is described in U.S. Pat. No. 5,020,744 issued to Schwarzschild. The initial spin axis attitude is established by a ground station. An additional sensor, such as a sun sensor, is used to determine the attitude within the plane of rotation. Angular rate information, obtained from gyroscopes, can than be used to propagate positional information. Because gyroscopes drift, frequent recalculation of the attitude by the ground station is required.

Several difficulties exist with current methods for determining the attitude of a spinning spacecraft. A first difficulty is hat current methods allow continuous on-board attitude updates from a sun sensor only once the attitude is determined with respect to a sun normal reference frame. If the attitude is determined with respect to an ECI reference frame, the attitude must be computed on the ground and transmitted to the spacecraft with time critical commanding. Further, once the attitude in the ECI frame is uploaded to the spacecraft, the attitude can only be propagated by the data from gyroscopes. Output from other sensors, such as sun sensors, and the spin axis data cannot be used on-board by tho spacecraft to update the attitude.

SUMMARY OF THE INVENTION

As such, one object of the present invention is to provide a system and method for determining the attitude of a spinning spacecraft in any inertial frame.

Another object of the present invention is to provide a system and method for reducing or eliminating the amount of ground processing necessary to determine the attitude of a spinning spacecraft.

In carrying out the above objects and other objects and feature of the present invention, a method is provided for obtaining information about the spacecraft momentum in an inertial frame, obtaining information about the spacecraft momentum in the body frame, updating the spacecraft attitude using the inertial frame momentum data, body frame momentum data, input from at least one additional sensor, and reference information on the at least one additional sensor, and propagating the attitude using angular rate sensors when the inertial frame momentum is not observable.

In the preferred embodiment, the rotational momentum vector direction in an inertial frame is determined on the ground using measurements taken on the spacecraft and is transmitted to the spacecraft. The rotational momentum vector direction in the body frame is also obtained on the ground using known or estimated mass properties and is transmitted to the spacecraft. The momentum vector directions, together with data from an at least single axis sensor, such as a sun slit sensor and a reference, such as a sun ephemeris model in the ECI frame, are used to update the spacecraft attitude. An at least single-axis sensor, such as a sun slit sensor, together with rate information from gyroscopes are used to propagate the spacecraft attitude.

In another embodiment, the body frame momentum vector is determined on board the spacecraft by summing the rotational moments from each distinct rotating component. Each individual rotational moment is obtained by multiplying the rotational velocity, with the moment of inertia. Both the rotational velocity and the rotational momentum may be determined from sensors or can be estimated from commanded movements.

A further embodiment calculates inertial frame rotational momentum vector direction on the spacecraft. This is accomplished using additional sensors, such as a pair of horizon crossing indicators, to locate a second positional reference. An ephemeris model is then used to compute the spin axis relative to the inertial frame.

A system is also provided in accordance with the present invention for determining the attitude of a spinning spacecraft. The system includes an inertial measurement device, one or more sensors for determining position about the spin axis, ephemeris model references if some or all inertial frame momentum computation will be done on-board, a communication system if some or all momentum computation will be done on Earth, and attitude determination logic for updating and propagating the spacecraft attitude.

The above objects and other objects, features, and advantages of the present invention are readily apparent from the following detailed description of the best mode for carrying out the invention when taken in connection with the accompanying drawings.

BEST MODE FOR CARRYING OUT THE INVENTION

Figure 1:
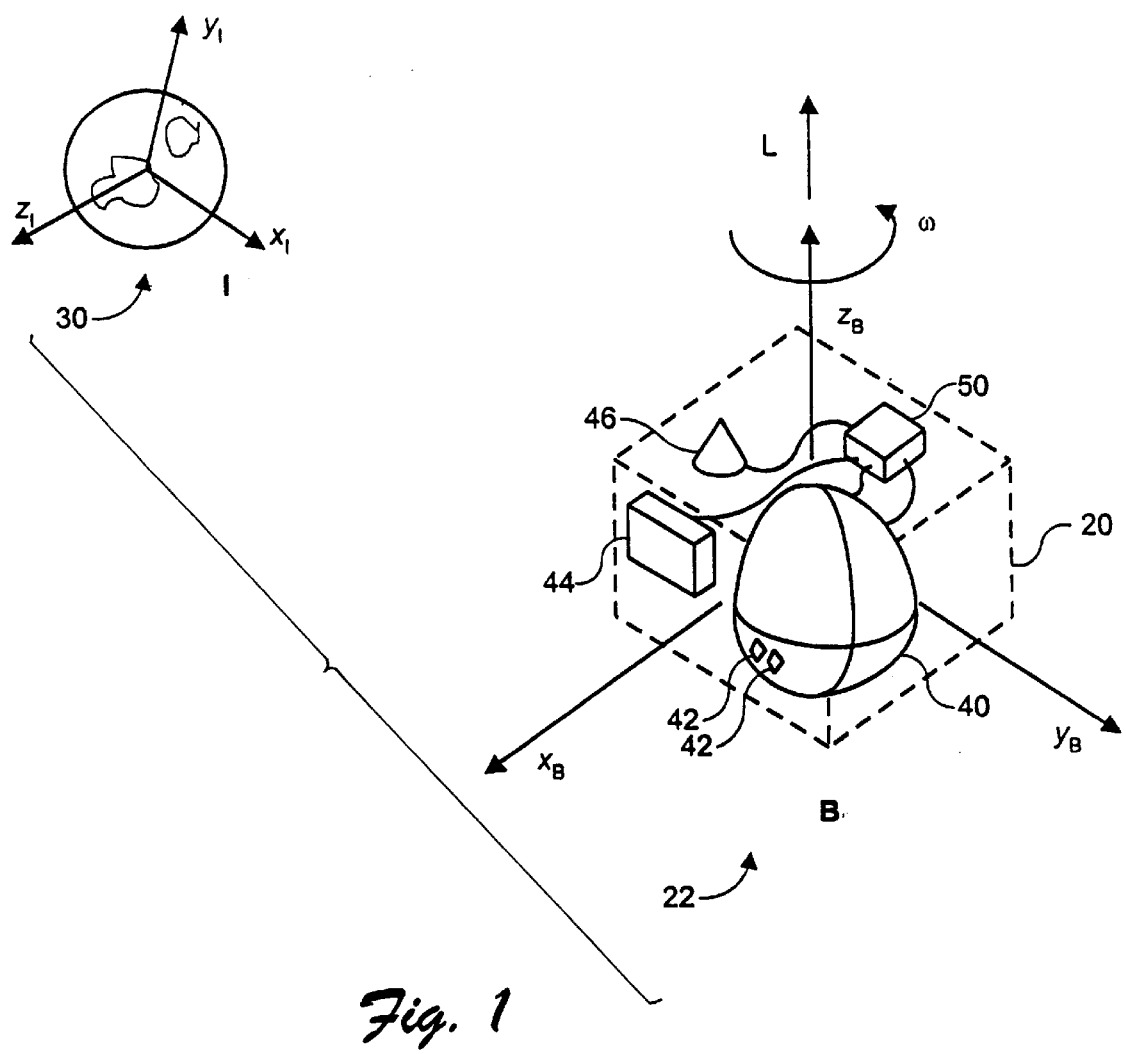
FIG. 1 is a graphical representation of a spacecraft that may use the method according to the present invention.

Referring now to FIG. 1, a graphical representation of a spacecraft with a body reference frame and an inertial reference frame is shown. A spacecraft 20 has a body frame, shown generally as 22, that may be used to described the attitude of the spacecraft. Spacecraft 20 is shown rotating with angular velocity $\omega$ about the $Z_B$ axis. The choice of a body reference frame is arbitrary, but is usually chosen based on spacecraft configuration and mission. Rotation in the body frame results in an angular momentum vector L. In the absence of nutation and wobble, L coincides with the axis of rotation.

An inertial reference frame I, shown generally as 30, may also be used to describe the attitude of spacecraft 20. For Earth orbiting satellites, it is convenient to use an ECI frame of reference. A vector described in one frame may be converted to a second frame of reference through a variety of techniques as is well known in the art.

Spacecraft 20 is shown with equipment that may be used to implement the present invention as an Earth orbiting satellite. Wide field of view sun sensor assembly (SSA) 40 measures two rectangular angles that describe direction to the sun in the body frame. Two horizon crossing indicators (HCIs) 42 measure the Earth cord which, together with orbit information, leads to the computation of the angle between the Earth nadir vector and the spacecraft spin axis. Inertial reference unit (IRU) 44 is a three-axis gyroscope used to provide inertial measurements for determining the spacecraft 20 angular rate and for propagating spacecraft 20 attitude. Antenna 46 transmits measurement signals to a ground station not shown and may receive calculations of the rotational momentum vector direction in the inertial frame and body frame from the ground station. Processor 50 accepts inputs from sensors including 40, 42 and 44 together with data received on antenna 46, calculates attitude, and provides control signals to actuators not shown.

Figure 2:
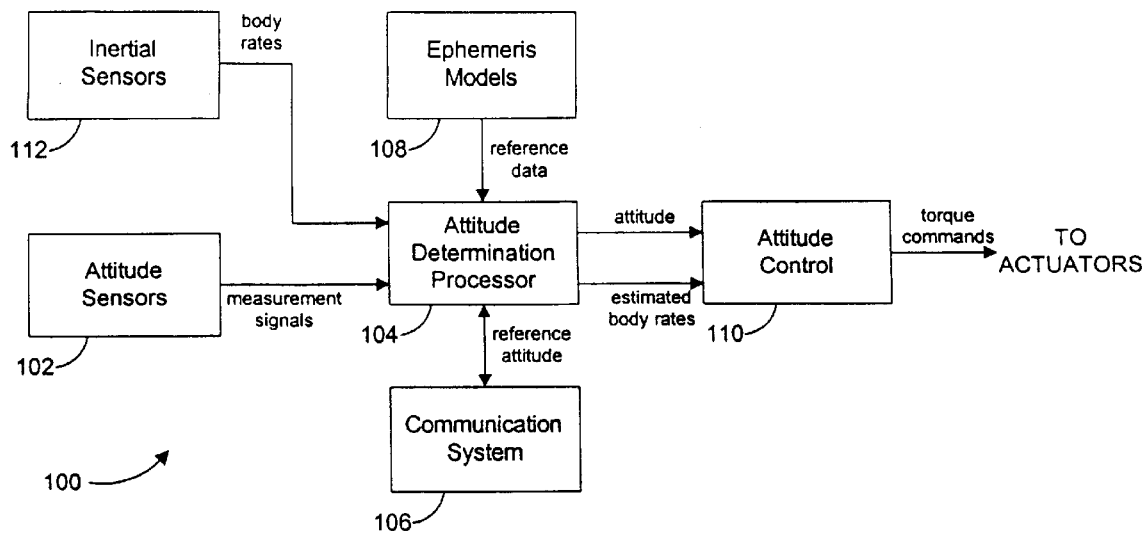
FIG. 2 is a block diagram of a general control arrangement for effecting a satellite maneuver in accordance with the invention.

Referring now to FIG. 2, block diagram of a general control arrangement for effecting a satellite maneuver in accordance with the present invention is shown.

Attitude sensors 102 provide data to an attitude determination processor 104. In the preferred embodiment of the present invention, attitude determination processor 104 periodically provides attitude measurement signals to communication system 106, which forwards the data to a ground-based station not shown. The ground station calculates a rotational momentum vector direction in the inertial frame using the measurement signals and a rotational momentum vector direction in the body frame using known and estimated mass properties. The ground station then transmits the moment vectors to communication system 106 which forwards the moment vector to attitude determination processor 104. Attitude determination processor 104 uses the transmitted moment vector together with additional measurement signals from attitude sensors 102 to calculate the current spacecraft attitude. When attitude control is required, the spacecraft attitude and estimates of the body rotation rates are obtained by actuator control 110, which provides torque commands to actuators not shown. If the momentum vector is not observable, body rates from inertial sensors 112 are read by attitude determination logic 104 to propagate the spacecraft attitude.

In another embodiment, some or all groundbased calculations are substituted by on-board calculations using attitude determination logic 104 and ephemeris models 108.

Figure 3:
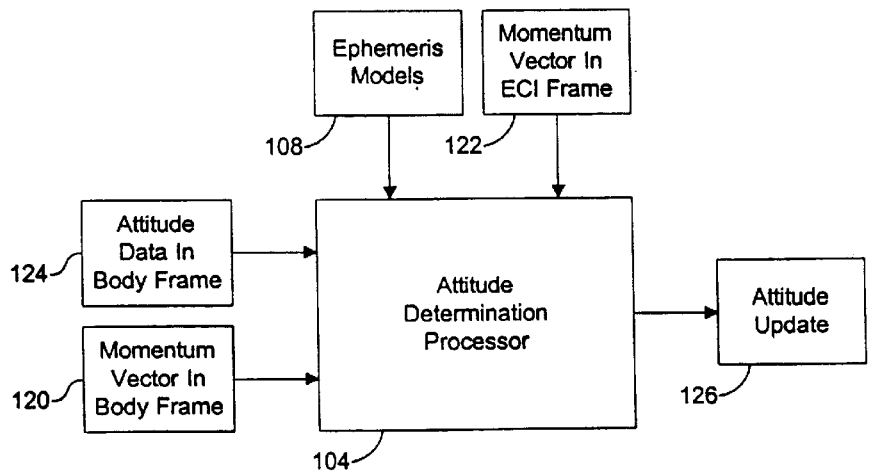
FIG. 3 is a block diagram indicating specific control inputs in accordance with the present invention.

Referring now to FIG. 3, a block diagram indicating specific attitude updating inputs is shown. Two input vectors and two reference vectors are required. Spacecraft momentum unit vector in the body frame, shown as 20, is one input vector. Spacecraft momentum unit vector in the ECI frame, indicated by 122, is the corresponding reference vector. The second input unit vector is derived from an at least single-axis sensor, such as a sun slit sensor, as in 124. A corresponding reference vector, such as the sun unit vector in the ECI frame, is obtained from ephemeris models 108. Attitude determination processor 104 produces the spacecraft attitude update 126 using a method such as TRIAD as is well known in the art.

Figure 4:
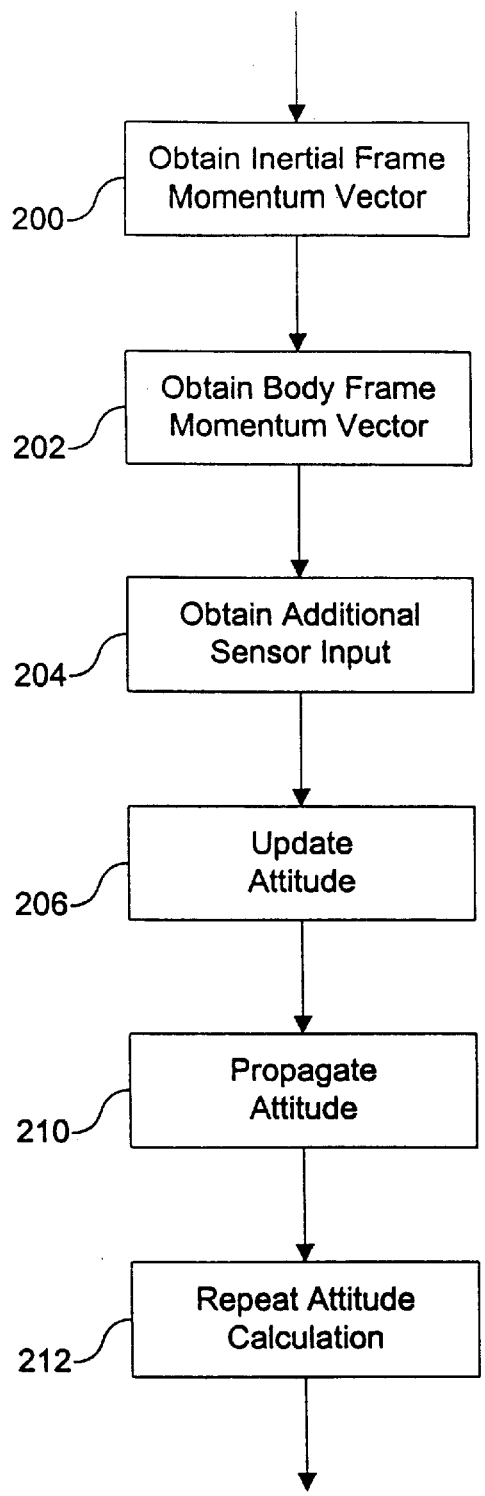
FIG. 4 is flow diagram representing operation of a system or method according to the present invention.

Referring now to FIG. 4, a flow diagram of the present invention is shown. As will be appreciated by one of ordinary skill in the art, the operations illustrated are not necessarily sequential operations. Similarly, operations may be performed by software, hardware, or a combination of both. The present invention transcends any particular implementation and is shown in a sequential flow chart form for ease of illustration.

The rotational momentum vector direction in the inertial frame is obtained as shown by 200. In the preferred embodiment of the present invention, one or more sensors sufficient to resolve the attitude of the spin axis relay data to a ground station where the attitude of the spin axis in the inertial frame is determined. The calculation of a single axis, such as the spin axis, based on the measurements from one or more sensors is well known in the art. In the absence of nutation and wobble, the spin axis coincides with the rotational momentum vector. The orientation of the rotational momentum vector in the inertial frame is then transmitted to the spacecraft.

In a further embodiment, the rotational momentum vector direction in the inertial frame is computed on the spacecraft. This requires knowledge of the spacecraft position as well as on-board ephemeris models relating the spacecraft position to the objects being sensed and to the inertial frame. Spacecraft attitude may be obtained from additional sensors such as, for example, an HCI and a sun slit sensor.

The body frame rotational momentum vector direction is obtained as shown in 202. In the preferred embodiment of the present invention, the body frame momentum vector is uploaded to the spacecraft from a ground station. In this embodiment, the spacecraft nutation and wobble are first minimized. Next, a principal axis for the spacecraft is calculated based on known and estimated mass properties. The principal axis is chosen based on known or commanded spacecraft spin. The principal axis orientation is the transmitted to the spacecraft as the rotational momentum vector direction in the body frame.

In another embodiment, the body frame rotational momentum vector is calculated on the spacecraft. This is accomplished by summing the momentum contributed by each satellite component with a distinct angular velocity as is shown in Equation (1):

$$L = \sum_{i=1}^{N} I_i \omega_i \tag{1}$$

where: $L$ = angular momentum vector $I_i$ = component moment of $\omega_i$ = component angular velocity.

A first major component is always the spacecraft central body and all subcomponents rotating with the central body. Candidates for consideration as a subcomponent include elements that may have time varying moments of inertia such as, for example, solar wings, booms and fuel tanks. Additional components with distinct rotational velocities include, for example, momentum wheels. The moments of inertia are precalculated prior to launch or, as in the case for fuel consumption, are calculated on the ground and relayed to the spacecraft. Angular velocities are determined if, for a given subcomponent, the rotational velocity is different than that of the spacecraft central body. Alternately, rotational velocities may be estimated on the ground based on known or commanded operation and relayed to the spacecraft.

Additional sensor input is obtained is in block 204. Once the spin axis is known, an additional measurement is required to locate the attitude within the spin plane. This measurement may be obtained from a single axis sensor such as, for example, a sun slit sensor, if the sensor is mounted to read angular position around the axis of rotation. Alternately, two-axis sensors such as, for example, an SSA, Earth sensor, or star sensor may be used, A three-axis sensor such as a star tracker may also be used in which case momentumbased information may be used to improve the accuracy of the measurement.

The attitude is updated as shown in block 206. In the preferred embodiment, four vectors are used to determine the spacecraft attitude and to obtain the transformation from the body frame to the inertial frame. These four vectors are the momentum vector in the body frame, the momentum vector in the inertial frame, the Sun vector in the body frame and the Sun vector in the inertial frame. A solution program such as, for example, TRIAD is used as is well known in the art.

In an alternate embodiment, a state-based technique may be used. Such techniques include extended Kalman filters and QUEST as is known to one of ordinary skill in the art.

The attitude is propagated, as in block 210. Propagation may be used to extend the periods between which momentum vectors are obtained, reducing the amount of spacecraft to-ground communication required. Methods for propagating attitude using the output of inertial sensors such as, for example, an IRU are well know in the art.

Attitude update calculations are repeated, as shown in block 212. In the preferred embodiment, rotational position is estimated using a model-based deterministic process. The estimate is checked against data obtained from the Sur, sensor and IRU. When input is not available as, for example, when the Earth eclipses the Sun from the spacecraft, the deterministic process continues to provide attitude estimates. The use of model-based deterministic methods for estimating attitudes is well known in the art.

In the preferred embodiment, the inertial and body frame momentum vectors may be updated once per day. This greatly reduces the amount of ground communication as compared to previous methods. The update period depends on external environmental torques, the drift of inertial sensors and the attitude accuracy required.

It is possible and desirable to implement more than one of the above embodiments on a spacecraft to provide redundancy and to increase the attitude accuracy.

While the best mode for carrying out the present invention has been described in detail, and several alternative embodiments have been presented, those familiar with the art to which this invention relates will recognize various alternative designs and embodiments within the scope and spirit of the present invention as defined by the following claims.

What is claimed is:

1. A method of determining the attitude in an inertial frame of a spacecraft spinning about an axis in a body frame, the method comprising:

determining a spacecraft momentum input vector direction in the inertial frame;

determining a spacecraft momentum input vector direction in the body frame independently from the step of determining a spacecraft momentum input vector direction in the inertial frame;

acquiring information from an at least single-axis sensor;

generating a single axis sensor input vector from the information from the at least single axis sensor in the body frame;

obtaining reference information on the at least single axis sensor to obtain a sensor reference vector in the inertial frame;

inputting the spacecraft momentum input vector direction in the inertial frame, the spacecraft momentum input vector direction in the inertial frame, the momentum vector direction in the body frame, single axis sensor input vector, and the sensor reference vector to update the attitude in the inertial reference frame; and propagating the attitude using data from one or more inertial sensors.

2. The method of claim 1 wherein determining the momentum vector direction in the inertial frame comprises:

obtaining information from a plurality of attitude sensors;

transmitting the information from the attitude sensors to a ground station;

determining the inertial frame momentum vector direction at the ground station; and transmitting the inertial frame momentum vector direction from the ground station to the spacecraft.

3. The method of claim 1 wherein determining the momentum vector direction in the inertial frame comprises:

reducing spacecraft nutation and wobble;

obtaining information from a plurality of spacecraft attitude sensors; and determining the inertial frame momentum vector direction from the spacecraft attitude sensors and an ephemeris model.

4. The method of claim 1 wherein determining the momentum vector direction in the body frame comprises:

reducing spacecraft nutation and wobble;

obtaining the principal axes;

determining which principal axis corresponds to spacecraft spin axis; and transmitting to the spacecraft the principal axis as the body frame momentum vector direction.

5. The method of claim 1 wherein the method of determining the momentum in the body frame of a spacecraft composed of a plurality of members comprises:

obtaining angular velocity for each of a plurality of spacecraft members;

obtaining principal moments of inertia for each of the plurality of spacecraft members;

determining the body frame momentum for each member by using the angular velocity for each member and the principal moments of inertia for each member; and summing the body frame momentums for each member.

6. A system of determining the attitude in an inertial frame of a spacecraft spinning about an axis in a body frame, the system comprising:

means for determining the direction of the spacecraft rotational momentum vector in the inertial frame;

means for determining the spacecraft rotational momentum vector direction in the body frame independently from the direction of the spacecraft rotational momentum vector;

a sensor system capable of producing data for resolving at least one axis of attitude into a sensor input vector;

a reference for the sensor system in the inertial frame as a sensor reference vector;

a processor accepting the inertial frame rotational momentum vector direction, the body frame momentum vector direction, the sensor input vector and the sensor reference vector and producing the spacecraft attitude update.

7. The system of claim 6 wherein the means for determining the rotational momentum vector direction in the inertial frame comprises:

a plurality of sensors operable to resolve the spacecraft spin axis attitude;

a communication system operable to transmit the data from the plurality of sensors;

a ground-based station operable to receive the sensor data, determine the spin axis attitude in the inertial frame, and transmit the spin axis attitude as the rotational momentum vector direction in the inertial frame; and a communication system operable to receive the rotational momentum vector direction in the inertial frame from the ground-based station.

8. The system of claim 6 wherein the means for determining the rotational momentum vector direction in the inertial frame comprises;

a plurality of sensors operable to resolve the attitude of the spacecraft rotational axis relative to a first reference and to a second reference;

a model operable to resolve the position of the first reference to the inertial frame and the second reference to the inertial frame; and a processor operable to input data from the plurality of sensors and from the model and to output the attitude of the rotational axis as the direction of the inertial frame rotational momentum vector.

9. The system of claim 6 wherein the means for determining the rotational momentum vector direction in the body frame comprises:

means for determining the angular velocity in each of a plurality of spacecraft members having a distinct angular velocity;

means for determining the body frame moment of inertia for each of a plurality of spacecraft members having a distinct angular velocity; and a processor operable to determine the body frame moment vector, wherein the body frame moment vector is found by summing the product of the angular velocity and the moment of inertia for each of a plurality of spacecraft members having a distinct angular velocity.

10. The system of claim 6 further comprising a ground station, wherein the means for determining the rotational momentum vector direction in the body frame comprises:

a control system on the spacecraft operable to minimize nutation and wobble;

a processor within the ground station operable to obtain the mass properties of the spacecraft;

a processor within the ground station operable to compute the principal axes of the spacecraft based on the mass properties;

means within the ground station for determining about which principal axis the spacecraft is rotating;

a transmitter operable to send to the spacecraft the principal axis of rotation as the rotational momentum vector direction in the body frame; and a receiver on the spacecraft operable to receive the momentum vector direction in the body frame.

11. The system of claim 6 wherein the sensor system comprises:

a horizon crossing indicator; and a sun sensor.

12. The system of claim 6 further comprising:

one or more gyroscopes;

a processor for accepting the inertial data from the one or more gyroscopes and the current spacecraft attitude and propagating a new spacecraft attitude.

13. A method of determining the attitude in an inertial frame of a spacecraft spinning about an axis in a body frame, the method comprising:

determining a spacecraft momentum input vector direction in the inertial frame at a ground station;

determining a spacecraft momentum input vector direction in the body frame independently from the step of determining a spacecraft momentum input vector direction in the inertial frame at a ground station;

transmitting the spacecraft momentum input vector direction in the inertial frame and the spacecraft momentum input vector direction in the body frame to the spacecraft;

acquiring information from an at least single-axis sensor;

generating a single axis sensor input vector from the information from the at least single axis sensor in the body frame;

obtaining reference information on the at least single axis sensor to obtain a sensor reference vector in the inertial frame;

inputting the spacecraft momentum input vector direction in the inertial frame, the spacecraft momentum input vector direction in the inertial frame, the momentum vector direction in the body frame, single axis sensor input vector, and the sensor reference vector to update the attitude in the inertial reference frame on the spacecraft; and propagating the attitude using data from one or more inertial sensors on the spacecraft.

* * * * *

UNITED STATES PATENT AND TRADEMARK OFFICE
CERTIFICATE OF CORRECTION

PATENT NO.    : 6,282,467 B1
DATED         : August 28, 2001
INVENTOR(S)   : Piyush R. Shah, Garry Didinski and David S. Uetrecht It is certified that error appears in the above-identified patent and that said Letters Patent is hereby corrected as shown below:

<u>Title page,</u>
Item [73], Assignee should read:
-- Hughes Electronics Corporation, El Segundo, CA --

Signed and Sealed this

Twelfth Day of August, 2003

JAMES E. ROGAN
*Director of the United States Patent and Trademark Office*